United States Patent [19]
Kikuchi et al.

[11] Patent Number: 5,099,954
[45] Date of Patent: Mar. 31, 1992

[54] OIL STRAINER DEVICE OF AN AUTOMATIC TRANSMISSION

[75] Inventors: Katsuya Kikuchi, Anjo; Chihiro Hosono, Okazaki; Yoichi Hayakawa, Toyoake, all of Japan

[73] Assignee: Aisin Aw Co., Ltd., Japan

[21] Appl. No.: 612,704

[22] Filed: Nov. 15, 1990

[30] Foreign Application Priority Data

Nov. 15, 1989 [JP] Japan ................................. 1-296704

[51] Int. Cl.⁵ ............................................. F01M 1/10
[52] U.S. Cl. .................................. 184/6.24; 210/168; 210/485; 210/499; 60/336
[58] Field of Search ................... 184/105.1, 6.24, 6.12; 123/196 A; 210/168, 171, 485, 484, 499; 60/336, 453, 454, 487, 488, 490

[56] References Cited

U.S. PATENT DOCUMENTS

| | | | |
|---|---|---|---|
| 1,228,558 | 6/1917 | Huff | 184/6.24 |
| 2,372,286 | 3/1945 | Mieras | 184/6.24 |
| 2,462,819 | 2/1949 | Trail | 210/168 |
| 3,773,144 | 11/1973 | Hummel | 184/6.24 |
| 3,793,692 | 2/1974 | Tate et al. | 210/484 |
| 4,387,023 | 6/1983 | Napier | 210/168 |
| 4,889,621 | 12/1989 | Yamada et al. | 210/168 |
| 4,914,968 | 4/1990 | Diermeier et al. | 184/6.24 |

FOREIGN PATENT DOCUMENTS 0751500  6/1956  United Kingdom ............... 184/6.24

Primary Examiner—Ira S. Lazarus
Assistant Examiner—Alan B. Cariaso
Attorney, Agent, or Firm—Lorusso & Loud

[57] ABSTRACT

A oil strainer device for an automatic transmission has an oil strainer with an oil suction, an oil supplying port, and an oil strainer, an opening portion formed in the transmission case, and a cover mounted on an opening portion for holding the strainer. The strainer has a meshed filter and a filter supporting plate with ribs forming lattice and is arc-shaped in cross section.

5 Claims, 3 Drawing Sheets

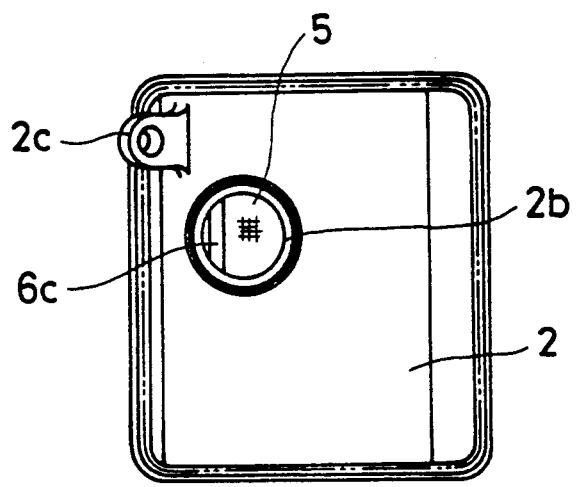
Fig. 3
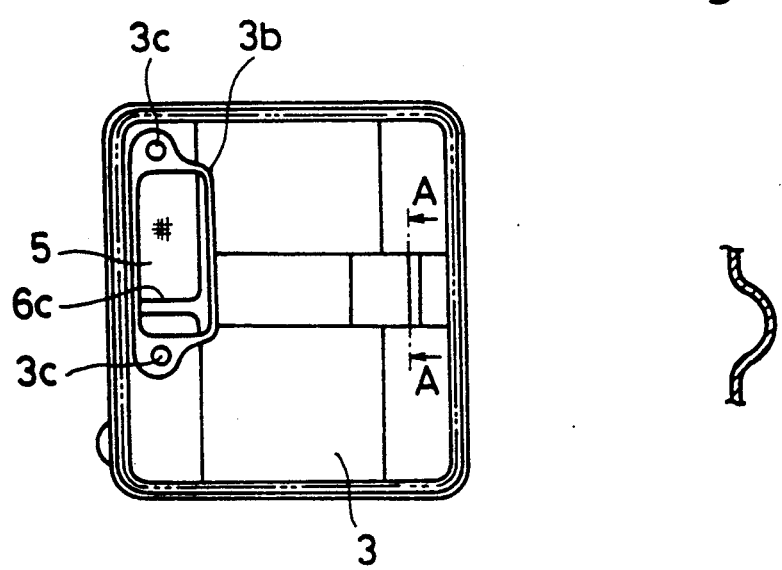
Fig. 4
Fig. 5

5,099,954

OIL STRAINER DEVICE OF AN AUTOMATIC TRANSMISSION

FIELD OF THE INVENTION

The present invention relates to an oil strainer device for an automatic transmission.

An automatic transmission has a torque converter, a planetary gear unit, friction engagement devices for engaging or disengaging rotational members of the planetary gear unit, a hydraulic servo for each friction engagement device, a hydraulic control device for supplying a hydraulic fluid to the hydraulic servos and each lubricating portion, and so on. A foreign body such as a chip in the hydraulic control device can cause a valve controlling the hydraulic fluid to stick. As the result, it may happen that the valve can't be moved even if the hydraulic fluid were supplied to the valve for moving it. Usually, an oil strainer is disposed in the hydraulic control device in order to prevent the valve from being stuck by removing foreign bodies from the hydraulic fluid.

Recently, development of a compact automatic transmission made created the difficulties of placing the conventional strainer in a restricted space, of increasing filtering area, and of lessening hydraulic resistance to a hydraulic fluid passing therethrough. And, it was very difficult to remove the strainer from the exterior of the hydraulic control device.

SUMMARY OF THE INVENTION

The object of the present invention is to solve the problem referred to above and to provide an oil strainer device for an automatic transmission, which can be removed from the exterior of the hydraulic control device and minimize a fluid resistance by providing a strainer with a larger filtering area in the restricted space.

Briefly, the oil strainer device of the present invention includes an oil suction, an oil supplying port and an oil strainer formed in the shape of an arc in cross section, an opening portion for installing or removing the strainer and an engagement hole for engaging the supplying port formed in a transmission case, a cover mounted on the opening portion to close the opening for holding the strainer, where said oil strainer is fixed to the cover in the transmission case. In the present invention, the filtering area of the strainer is increased, the fluid resistance is lessened, and the oil strainer means is disposed in a restricted space because the oil strainer 1 is formed with an arc shape in cross section and a hydraulic fluid is supplied to the strainer 4 in the perpendicular direction.

The oil strainer device 1 is easily removed or installed from or to the case 10 because the strainer device 1 is formed as a cartridge and fixed to the transmission case 10 or the cover 12 for installation.

BRIEF DESCRIPTION OF THE DRAWING

FIG. 3 is a plan view of an embodiment of an oil strainer device according to the present invention:

FIG. 4 is a base view of an embodiment of an oil strainer device according to the present invention:

FIG. 5 is a sectional view of FIG. 4 cut by A—A line; and

DESCRIPTION OF THE PREFERED EMBODIMENT

An embodiment of the present invention is described in the following with reference to the drawings.

Figure 1:
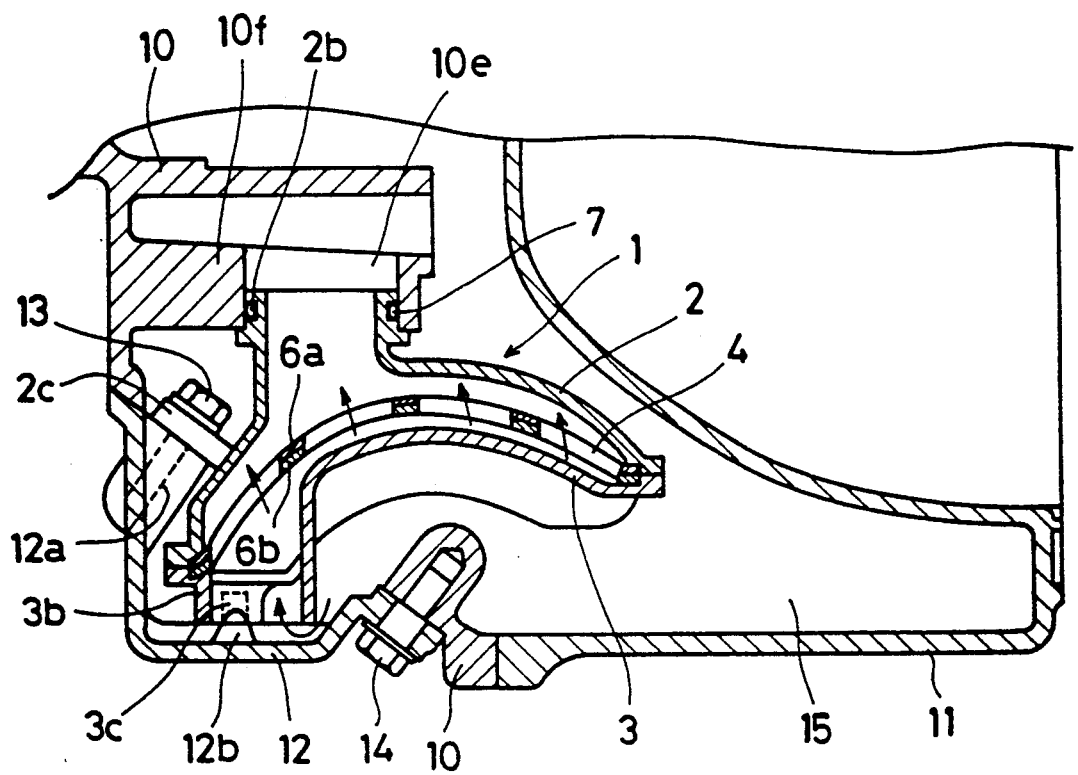
FIG. 1 is a sectional view showing an oil strainer device according to the present invention.

As shown in FIG. 1, an oil strainer device 1 has an upper case 2, a lower case 3, and a strainer 4, and is disposed in the oil reservoir 15 formed in the lower space of a torque converter case.

The upper case 2 and the lower case 3 are made of resin and are formed of arc shape in cross section. A strainer 4 is fixed between the upper case 2 and the lower case 3. One end of each of the upper and lower cases 2, 3 is extended from the transmission case 10 to the torque converter case 11.

Figure 2:
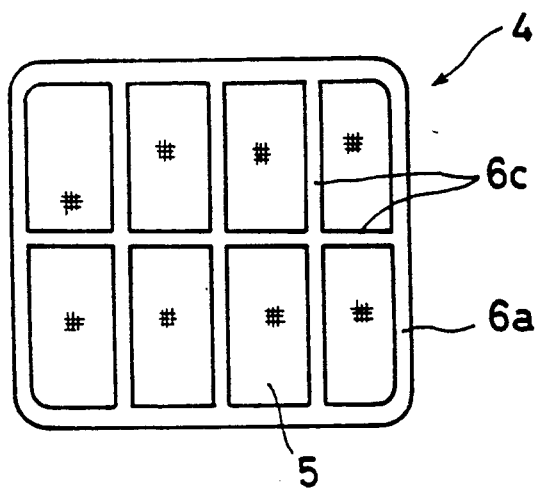
FIG. 2 is a plan view of a strainer according to the present invention.

The strainer 4 is formed of arc shape in cross section, and has filter supporting plates 6a, 6b and a meshed filter 5 fixed therebetween as shown in FIG. 2. The filter supporting plates 6a, 6b each have a lattice formed of ribs 6c.

As shown in FIG. 3, the upper case 2 has an oil supplying port 2b and a bracket 2c for fixing a strainer thereto, which are integral to the case 2. An O-ring 7 is disposed around the oil supplying port 2b.

As shown in FIG. 4, an oil suction 3b and holes 3c for mounting are formed in the lower case 3.

Figure 6:
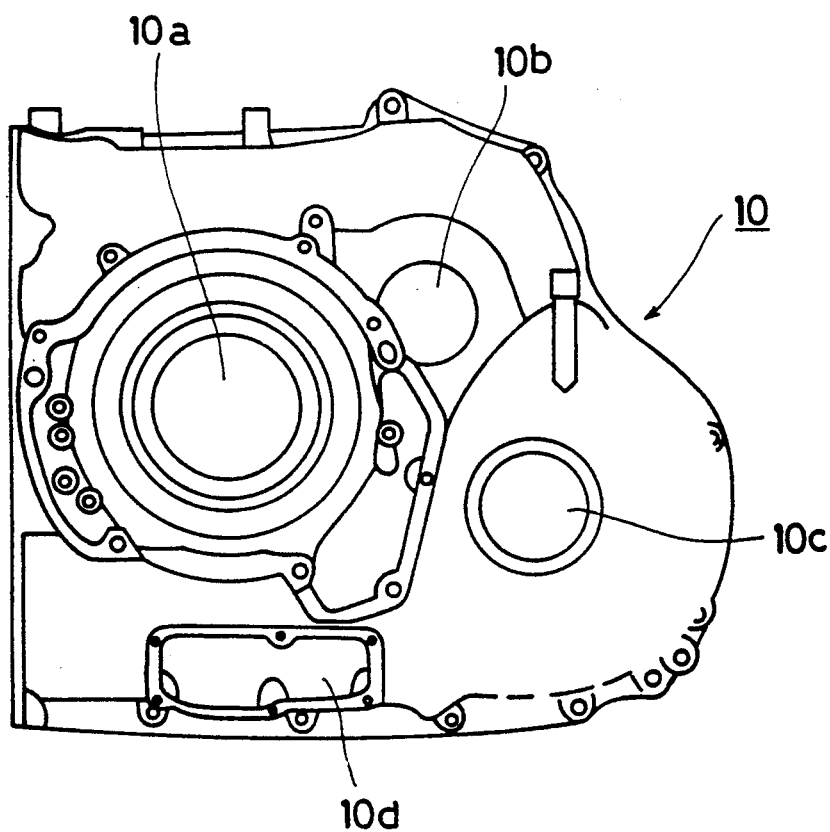
FIG. 6 is a front view of a transmission case according to the present invention.

As shown in FIG. 6, a gear mechanism has a first, second and third shafts which are disposed in parallel with each other and supported by the transmission case 10. The shafts are disposed in the openings 10a, 10b and 10c formed in the case 10. An opening 10d for installing or removing an oil strainer device is formed in the lower portion of the case 10. As seen in FIG. 1, a support 10f with an engagement hole 10e is formed near the opening 10e of the transmission case 10 as shown in FIG. 1. A cover 12 for installing an oil strainer is used for shutting the opening 10d, and has a bolt hole 12a and a protrusion 12b for mounting.

An explanation of installation of the above mentioned oil strainer device is described as following;

At first, hole 3c of oil strainer device 1 is engaged with protrusion 12b of cover 12. A bolt 13 is screwed in the bracket 2c and bolt hole 12a of the cover 12 in order to fasten the oil strainer device 1 to the cover 12.

Secondly, oil strainer device 1 is inserted in the opening 10d of the transmission case. After the oil supplying port is engaged in the engagement hole 10e, the cover 12 is fixed to the transmission case 10 by the bolt 14. At this time, a hydraulic gasket (not shown in any figures) is fastened between the cover 12 and the transmission case 10. The oil strainer device is removed by reversing the above-described procedure.

The hydraulic fluid is filtered through the oil strainer device, as follows;

A hydraulic fluid sucked by an oil pump through the oil supplying port 2b through the oil suction 3b and strainer 4 in turn.

In the present invention, oil strainer device 1 is formed of an arc shape in cross section and is disposed perpendicular to the direction, in which hydraulic fluid flows, as shown by arrows in FIG. 1 in order to lessen fluid resistance and to increase filtering area. And an oil strainer device 1 formed as a cartridge is fixed to the cover 12 or the transmission case 10 in order to be installed or removed in or from the case 10.

The invention may be embodied in other specific forms without departing from the spirit or essential characteristics thereof. The present embodiments are therefore as illustrative and not restrictive, the scope of the invention being indicated by the appended claims rather than by the foregoing description, and all changes which come within the meaning and range of equivalency of the claims are therefore intended to be embraced therein.

For example, in above specific forms, the oil strainer device 1 is fixed to the cover 12. Alternatively, the strainer device 1 may be fixed to the transmission case 10.

We claim:

1. The combination of a transmission casing and an oil strainer mounted in said casing, said casing having an access port for mounting and removing said oil strainer from the exterior of said casing and a cover for closing said access port, said oil strainer comprising:

a strainer housing having upper and lower sections joined together at a common edge around the periphery of said strainer housing, an oil suction inlet on said lower section, at one side of said strainer housing adjacent said common edge and an oil supply outlet on said upper section, said oil suction inlet being fixed to said cover and said housing extending slanted away from said oil suction inlet to a second side of said strainer housing suspended within said casing at a point higher than said oil suction inlet; and a strainer element, arc-shaped in cross-section, mounted in said strainer housing, said strainer element having a peripheral edge portion joined to said strainer housing around said common edge, thereby separating said upper and lower sections.

2. The combination of claim 1 wherein said strainer element is a mesh filter and further comprising at least one filter support plate in the form of a lattice of ribs, for supporting the mesh filter thereon.

3. The combination of claim 1 wherein each of said upper and lower filter support plates and each of said upper and lower sections of said strainer housing are arc-shaped in cross-section.

4. The combination of claim 1 wherein said upper and lower sections are both convex and arched upwardly.

5. The combination of claim 1 wherein said strainer housing is of a size permitting removal from said casing through said port.

* * * * *

UNITED STATES PATENT AND TRADEMARK OFFICE
CERTIFICATE OF CORRECTION

PATENT NO. : 5,099,954

DATED : March 31, 1992

INVENTOR(S) : KIKUCHI et al

It is certified that error appears in the above-identified patent and that said Letters Patent is hereby corrected as shown below:

Title Page

Under Assignee:, "Aisin Aw" should read --Aisin AW--.

Column 1, line 35, "transmission," should read --transmission--; and line 37, before "minimize" insert --to-- and delete "a", first instance.

Column 2, line 61, delete "26" and insert --2b--.

UNITED STATES PATENT AND TRADEMARK OFFICE
CERTIFICATE OF CORRECTION

PATENT NO. : 5,099,954            Page 2 of 2
DATED : March 31, 1992
INVENTOR(S) : KIKUCHI et al It is certified that error appears in the above-indentified patent and that said Letters Patent is hereby corrected as shown below:

Column 2, line 61, delete "26" and insert --2b--.

Signed and Sealed this

Tenth Day of August, 1993

Attest:

MICHAEL K. KIRK

*Attesting Officer*      *Acting Commissioner of Patents and Trademarks*